United States Patent

Keck et al.

[11] Patent Number: 5,353,363
[45] Date of Patent: Oct. 4, 1994

[54] OPTICAL FIBER BENDABLE COUPLER/SWITCH DEVICE

[75] Inventors: Donald B. Keck, Big Flats; Mark A. Newhouse; David L. Weidman, both of Corning, all of N.Y.

[73] Assignee: Corning Incorporated, Corning, N.Y.

[21] Appl. No.: 143,753

[22] Filed: Nov. 1, 1993

[51] Int. Cl.⁵ ............................................. G02B 6/24
[52] U.S. Cl. ................................. 385/46; 385/15; 385/16; 385/25; 385/32; 385/42; 385/43; 385/48; 385/50; 385/24
[58] Field of Search ............... 385/15, 16, 24, 22, 385/23, 25, 27, 28, 31, 32, 42, 43, 46, 48, 50

[56] References Cited

U.S. PATENT DOCUMENTS

| | | | |
|---|---|---|---|
| 4,243,296 | 1/1981 | Aulich et al. | 385/43 X |
| 4,291,940 | 9/1981 | Kawasaki et al. | 385/43 X |
| 4,753,501 | 6/1988 | Battle | 385/16 X |
| 4,763,977 | 8/1988 | Kawasaki et al. | 385/43 |
| 4,773,924 | 9/1988 | Berkey | 385/43 X |
| 4,836,644 | 6/1989 | Eisenmann et al. | 385/43 X |
| 4,895,423 | 1/1990 | Bilodeau et al. | 385/12 X |
| 4,896,935 | 1/1990 | Lee | 385/16 X |
| 5,004,316 | 4/1991 | Hill et al. | 385/43 X |
| 5,121,452 | 6/1992 | Stowe et al. | 385/43 X |
| 5,146,519 | 9/1992 | Miller et al. | 385/43 X |
| 5,175,782 | 12/1992 | Bowen et al. | 385/51 |
| 5,239,599 | 8/1993 | Harman | 385/16 |
| 5,278,692 | 1/1994 | Delapierre | 385/16 X |
| 5,317,658 | 5/1994 | Bergland et al. | 385/16 |

FOREIGN PATENT DOCUMENTS 0048855  5/1982  European Pat. Off. .......... 385/43 X

*Primary Examiner*—Brian Healy
*Attorney, Agent, or Firm*—William J. Simmons, Jr.

[57] ABSTRACT

A 1×N fiber optic switch is disclosed for selectively coupling light from a first fiber to any one of a plurality of output fibers. The switch includes a coupler in which the first optical fiber and the plurality of optical fibers are elongated in a narrowed coupling region. The coupling region can be bent in various directions to cause the radius of curvature of the input fiber to differ from that of at least one of the output fibers, whereby light propagating in the input fiber can be coupled to only one of the output fibers or to more than one of those fibers.

20 Claims, 5 Drawing Sheets

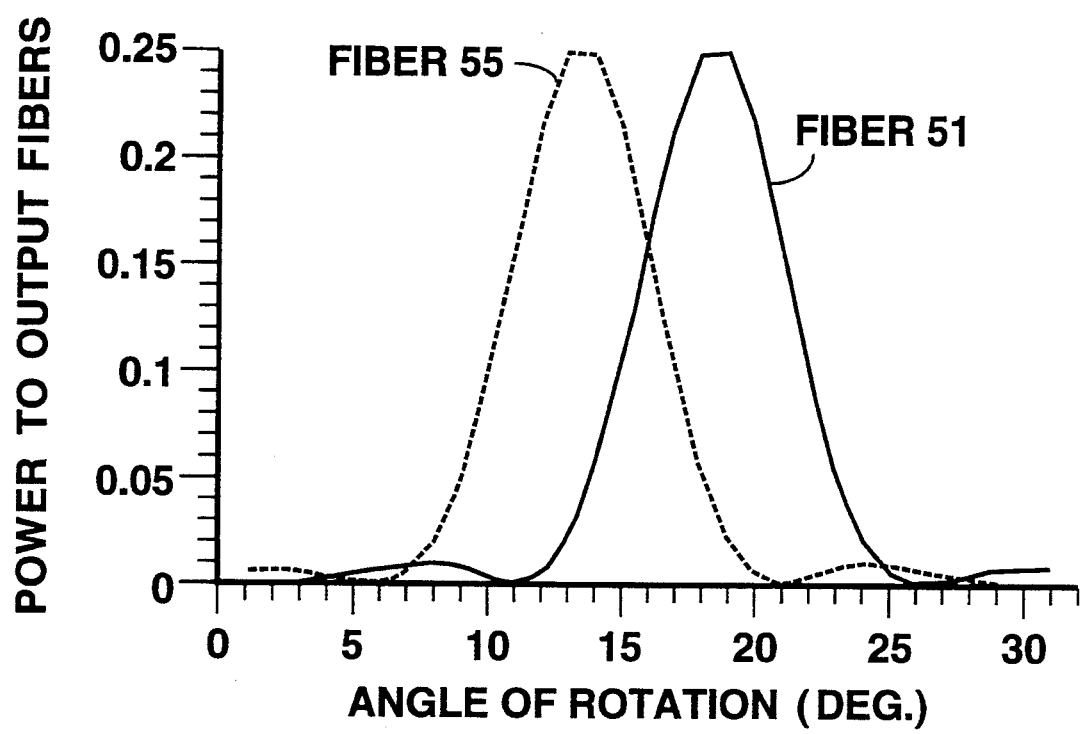
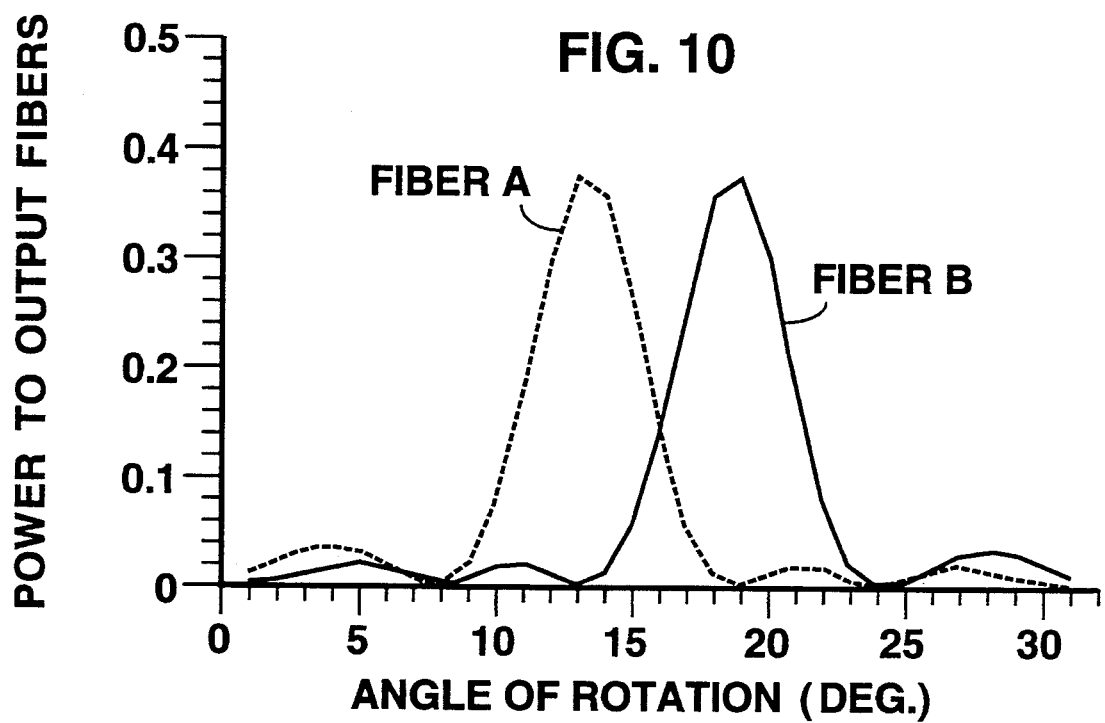

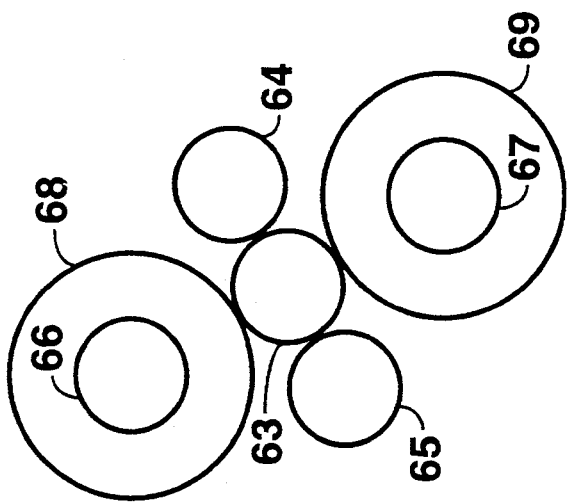
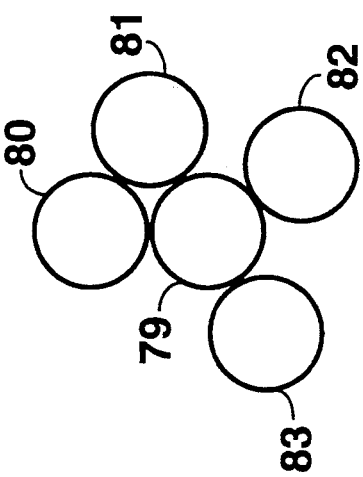
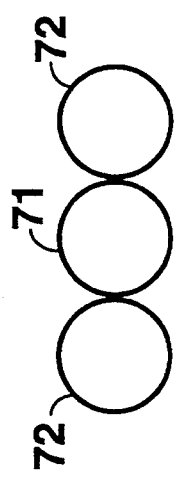
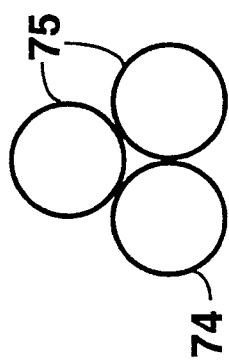
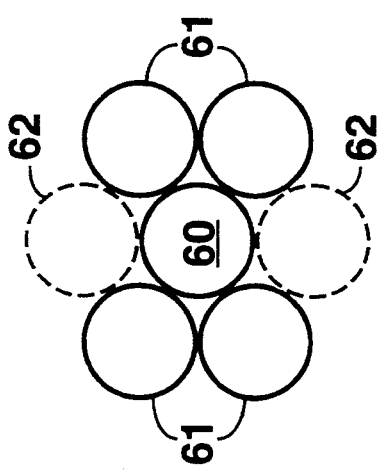
FIG. 12
FIG. 15
FIG. 13
FIG. 14
FIG. 11

OPTICAL FIBER BENDABLE COUPLER/SWITCH DEVICE

BACKGROUND OF THE INVENTION

This invention relates to 1xN fiber optic switches for selectively connecting a first optical fiber to any one of a plurality of optical fibers at a given wavelength or wavelengths, wherein N is equal to or greater than 2 and is equal to the number of output fibers; however there must be at least two output fibers that are not a continuation of the input fiber.

In certain optical systems it is desirable to selectively connect a signal propagating in a first optical fiber to a number of different receiving stations. Alternatively, it may be desirable to connect the signals propagating in a plurality of optical fibers to a single receiver or detector. Heretofore, most types of alternative interconnection systems were bulky, expensive and unreliable.

U.S. Pat. No. 4,753,501 (S. D. Battle) discloses a fiber optic rotary switching device which incorporates a rotating shutter capable of accepting a single input fiber. The input fiber is operatively connected with the rotatable shutter by a floating ferrule so that the fiber is capable of being rotated to a number of different positions without twisting. Situated adjacent the shutter is a housing having a faceplate which incorporates a plurality of output fibers that are selectively aligned end-to-end with respect to input fiber as the input fiber rotates to a variety of preselected, positions. At the point of interconnection of the input and output fibers, all fibers are parallel to a central axis.

In accordance with the teachings of U.S. Pat. No. 4,896,935 (H. Lee) an optical switching device comprises N fixed optical fibers which are located so that one end of each fiber is optically aligned with a center point. A rotatable optical fiber can be aligned end-to-end with any one of the N fixed fibers.

In the aforementioned switches, wherein the optical fibers are connected end-to-end, a loss is incurred due to axial misalignment, angular misalignment and end separation of the two aligned fibers. Single mode fibers are especially sensitive to these coupling misalignments. Furthermore, the alignment tolerances for low loss connections are very stringent, making such devices expensive and sensitive to environmental changes, vibration, mechanical shock, and other external conditions.

The aforementioned loss problem has been addressed in connection with 2-fiber coupler switches; for example, see U.S. Pat. Nos. 4,763,977; 5,146,519 and European Patent 0,048,855. To make this type of switch, a pair of optical fibers are fused together at a narrowed waist region, each fiber being formed of a core and cladding, and each being tapered toward the waist in such a manner as to insure adiabatic propagation of light in the structure.. An optical signal carried by one fiber first passes through a decreasing taper region and then passes through an increasing taper region of one or the other fibers (or both). The coupler is bent in the region of the waist whereby a coupling ratio can be selected between the incoming fiber portions and the outgoing fiber portions. By bending the coupler in the plane in which the two fibers lie, a signal that is input to one of the fibers can be switched between the two output fibers. However, none of these coupler-type switches is capable of coupling light to two or more output fibers that are distinct from the input fiber.

SUMMARY OF THE INVENTION

It is therefore an object of the present invention to provide a 1×N (N≧2) fiber optic switch that is not subject to the loss incurred by prior art 1×N switches. A further object is to provide a 1×N fiber optic switch in which light is selectively coupled from an input fiber to one of a plurality of output fibers by evanescent coupling. While N can be as small as 2, there must be at least two output fibers that are not a continuation of the input fiber, so that the switch of the present invention must contain at least three different fibers.

Briefly, the present invention relates to a fiber optic switch comprising a coupler having at least a first optical fiber and a plurality of optical fibers. Portions of the plurality of fibers are situated adjacent a portion of the first fiber and are spaced around the first fiber in a narrowed region where the fibers are elongated and the plurality of fibers are optically coupled with the first optical fiber. Means are provided for changing the propagation constant of each of the plurality of fibers with respect to the propagation constant of the first fiber. The first fiber usually functions as the input fiber, and the plurality of fibers usually function as the output fibers. One of the output fibers may be a continuation of the input fiber.

The propagation constants are preferably changed by bending the coupler at the narrowed region. The bending means can be capable of bending the coupler in a first direction to maximize coupling to one of the plurality of fibers and of bending the coupler in a second direction to maximize coupling to another of the plurality of fibers. It can also be capable of bending the coupler in a direction that induces simultaneous coupling to more than one of the plurality of fibers.

The coupling characteristics of the coupler can be such that (1) there is substantially no coupling from the first fiber to the plurality of fibers when the coupler is in the unbent state, (2) substantially all of the light propagating in the first fiber couples to the plurality of fibers when the coupler is in the unbent state, or (3) part of the power from the first fiber couples to the plurality of fibers when the coupler is in the unbent state.

BRIEF DESCRIPTION OF THE DRAWINGS

FIGS. 9 and 10 are graphs illustrating the power coupled to two output fibers of two different types of 1×8 switches as a function of the angle of rotation of the switch.

FIGS. 11 through 15 schematically illustrate coupling regions in which the output fibers are symmetrically disposed (FIGS. 11, 13 and 14) or non-symmetrically disposed (FIGS. 12 and 15) with respect to the input fiber.

DETAILED DESCRIPTION OF THE INVENTION

This invention relates to 1×N switches that consist of fiber optic couplers, the coupling region of which is under the influence of means for changing the propagation constants of some of the output fibers with respect to the propagation constant of the input fiber. Whereas various optical effects such as those induced by stress, temperature, electric field or the like can effect a relative change in the propagation constants of the coupler fibers, bending of the coupling region of the coupler is a more practical way to effect the desired propagation constant change. In accordance with this invention, the coupler comprises a coupling region in which a plurality of output optical fibers are so disposed with respect to an input optical fiber that there is optical coupling between them. The input fiber is optionally extended to become an additional output. The total number of outputs from the coupler is N, wherein N is 2 or more. Two of the many possible embodiments, 4-around-1 and 8-around-1, are specifically discussed herein, and additional embodiments are suggested.

A theoretical analysis was made of achromatic couplers using coupled mode theory to model their behavior. The analysis was based on the principles taught in the publication, A. W. Snyder and J. D. Love, *Optical Waveguide Theory*, Chapman and Hall, New York, 1983. The types of couplers analyzed were N fibers equally spaced in a ring around a central fiber. In accordance with this theory, the mode field of the N-around-1 overclad coupler is assumed to be a linear combination of the fundamental modes $\Psi_j$ of each of the fibers $F_j$, j=0, 1, 2, ..., N ($F_o$ being the central fiber, $F_j$, j=1, 2, ..., N being the surrounding fibers) in the absence of the other fibers, i.e., with the fiber surrounded by only overclad index material $n_3$. The propagation constants and mode fields can be determined exactly for each fiber in the absence of the others (see M. J. Adams, *An Introduction to Optical Waveguides*).

The coupling constant which describes the optical coupling between any two fibers $F_i$ and $F_j$ can be approximated by the integral $$C_{ij} = \int \Psi_i(r)\Psi_j(r')(n-n')dA \tag{1}$$

In this equation, $\Psi_i$ and $\Psi_j$ are the mode fields of the two fibers, r and r' are the radial distances from the center of the cores of fibers $F_i$ and $F_j$, respectively, n is the index structure of the entire coupler, n' is the index structure with the core of $F_i$ replaced by overcladding material of index $n_3$, and the integral is over the entire cross-section of the coupler (but n−n' is only non-zero over the core and cladding of fiber $F_j$). The mode fields are assumed to be normalized in this equation, i.e. the integrals $\int \Psi_i^2 dA$ and $\int \Psi_j^2 dA$ are both equal 1.

Figure 1:
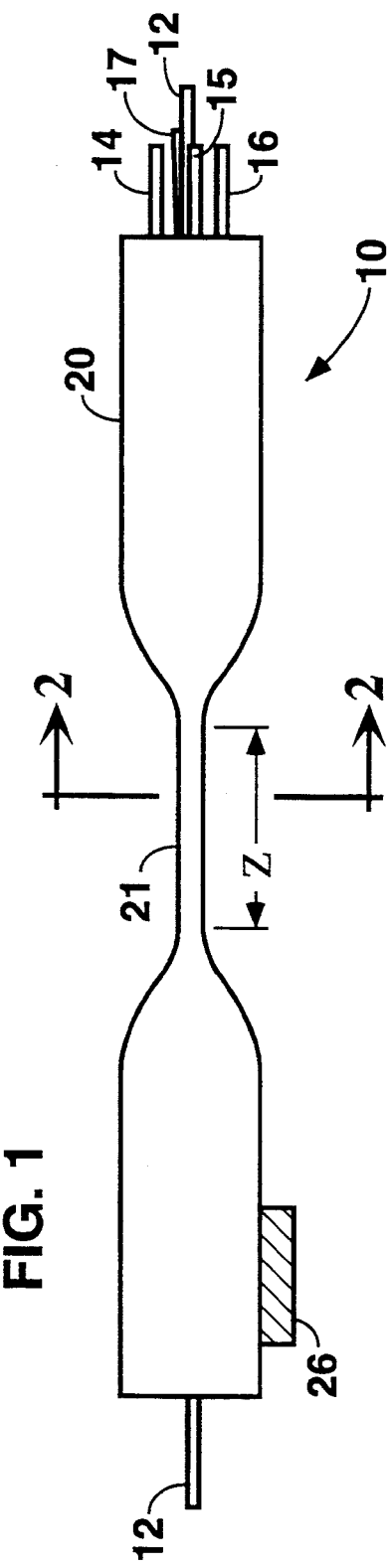
FIG. 1 shows a 1×N switch.

These are tapered devices in which the diameter of the device gradually decreases to the narrowest diameter region in the center of the taper. However, their qualitative behavior is adequately modeled by assuming a constant minimum diameter region over a given coupling length, with no coupling outside this length, i.e. assuming that the diameter of region 21 of FIG. 1 is constant over the entire length z. This approximation works well since the coupling constant rapidly increases as the dimensions are decreased, and thus the behavior of a coupler is dominated by the behavior in the region of smallest cross-sectional dimension.

If only nearest-neighbor coupling is considered (usually a good approximation), and it is assumed that power is input into the central fiber, then the power as a function of length in any one of the ring fibers is given by $$P_j(z) = F^2/N \sin^2(Cz/F) \quad j=1,\ldots,N \tag{2}$$

where $$F^2 = \frac{1}{1 + \frac{(\beta_0 - \beta_1 - 2C_{12})^2}{4C^2}} \tag{3}$$

$\beta_0$ is the propagation constant of the central fiber; $\beta_1$ is the propagation constant of the ring fibers, all of which are assumed to be identical; $C=N^{\frac{1}{2}}C_{01}$; $C_{01}$ is the coupling between central and each ring fiber ($C_{01}=C_{02}=\ldots=C_{0N}$); and $C_{12}$ is the coupling between adjacent ring fibers ($C_{12}=C_{23}=\ldots$).

The central fiber power, which is assumed to be 1 on input, is given by $$P_0(z) = 1 - F^2 \sin^2(Cz/F) \tag{4}$$

Figure 8:
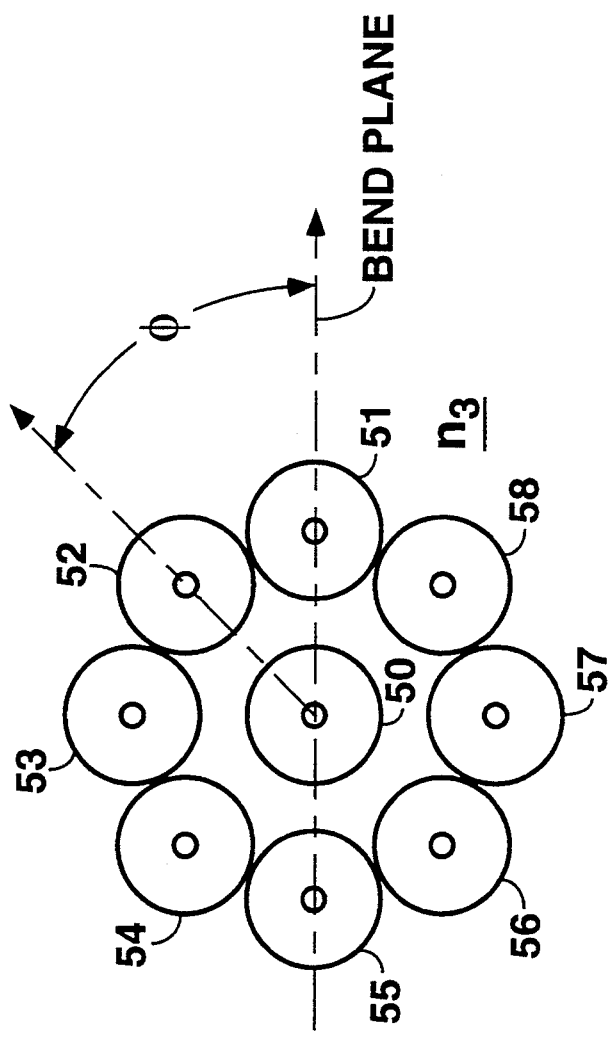
FIG. 8 shows the arrangement of fibers in the coupling region of a 1×8 switch.

When the propagation constants of all of the ring fibers are not identical, the above solution no longer applies. In this case, the differential equations describing the coupling must be solved numerically. They can be written as $$\frac{da_0}{dz} - i\beta_0 a_0 = i\Sigma C_{0j}a_j \tag{5}$$

$$\frac{da_j}{dz} - i\beta_j a_j = iC_{01}a_0 + iC_{j,j+1}a_{j+1} + iC_{j,j-1}a_{j-1} \tag{6}$$

where j=1, ..., N and where the $a_j$ are the field amplitudes such that the field in fiber j is given by $a_j\Psi_j(r)$, and where the $\Psi_j(r)$ are the unperturbed fiber solutions mentioned above, and where, in equation 6, if j+1 is equal to N+1, it is replaced by 1, and similarly, if j−1 is equal to zero, it is replaced by N. When the coupler is bent, the propagation constants are further modified [see Y. Murakami and S. Sudo, Applied Optics, 20, 417–422 (1981)]. Since only the relative changes of the propagation constants impact the coupling, it is assumed that the central fiber propagation constant is unchanged. If the maximum change of propagation constants in a ring fiber located in the bend plane with respect to the central fiber is $\delta\beta_{bend}$ and fiber 1 has an orientation angle $\phi$ with respect to the bend plane (see FIG. 8), then the propagation constants in the above differential equations 5 and 6 are modified by the replacement $$\beta_j \rightarrow \beta_j + \delta\beta_{bend}\cos\left[\phi + (j-1)\frac{\pi}{4}\right] \tag{7}$$

These results can then be solved numerically for a given set of coupling constants, $\delta\beta_{bend}$, and bend angle $\phi$. The bend plane is defined as the plane passing through the input fiber such that any other fibers in that plane have maximum change of propagation constant.

Results can be made more quantitative by integrating the coupling equations along the taper. Still more accurate simulations may be done using beam propagation techniques (Fourier transform, finite difference, etc.), although at the cost of much increased computational time.

Figure 2:
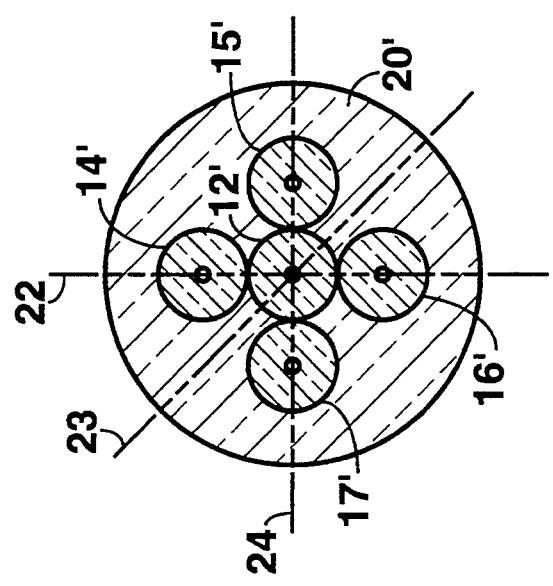
FIG. 2 is a cross-section taken along lines 2—2 of FIG. 1.

FIGS. 1 and 2 illustrate an overclad fiber optic switch 10 in which optical fibers 14'-17' are optically coupled to optical fiber 12'. The device will function as a 1×5 or a 1×4 depending on whether fiber 12 is used as an output fiber as well as an input fiber. Each of the fibers includes a glass core of refractive index $n_1$ surrounded by cladding glass. The fibers are embedded in a tube 20 of matrix glass. The refractive index $n_3$ of the inner region of the matrix glass adjacent the fibers is lower than $n_2$, the lowest refractive index of any of the fiber claddings. Commercially available single-mode optical fibers usually have a value of n2 that is equal to or near that of silica. If silica is employed as the base glass for the tube, a dopant such as $B_2O_3$, and optionally fluorine, is added thereto for the purpose of decreasing the tube refractive index $n_2$ to a value lower than $n_2$.

Figure 3:
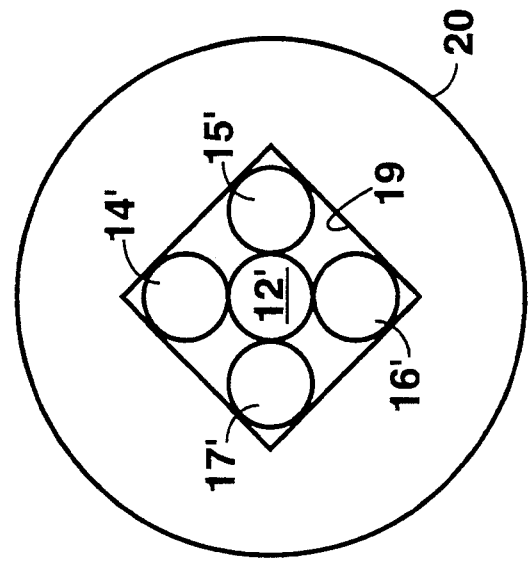
FIG. 3 illustrates an arrangement of fibers in a tube during the forming of a coupler preform.

Overclad couplers can be formed in accordance with the teachings of U.S. Pat. Nos. 5,009,692, 5,011,251, 5,017,206 and 5,104,434, which are incorporated herein by reference. As shown in FIG. 3, a suitable tube 20 for forming a 1×5/1×4 switch has a square bore 19. A funnel is located at each end of the tube to facilitate fiber insertion. Coated optical fibers 12 and 14-17 consist of optical fibers 12' and 14'-17' and their protective coatings. A portion of the coating intermediate the ends of coated fiber 12 is removed for a distance slightly shorter than the length of the bore. Coated fiber 12 is threaded from the first end of the tube and through the bore until the uncoated portion 12' is disposed within the tube midregion. For a 1×5 device, a usable length of coated fiber 12 extends beyond each end of tube 20. For a 1×4 device, fiber 12 need extend only from the first end of the tube. A portion of the coating is removed from an end of each of the coated fibers 14-17, and they are inserted through the funnel at the second end of the tube and into the tube bore so that they extend through the tube midregion, their uncoated portions being disposed within the funnel. Usable lengths of coated fibers 14-17 extend beyond only the second end of tube 20. The fiber ends can be provided with low-reflection terminations.

The tube midregion is heated and evacuated to cause it to collapse onto the fibers. The central portion of the midregion is thereafter drawn or stretched to form a neckdown region 21, the diameter and coupling length of which is such that it provides the desired coupling.

Coupling between adjacent fibers depends upon the propagation constants $\beta_{CR}$ of the fibers or waveguides in the coupling region. When the fiber cladding diameter becomes sufficiently small, the composite of the core and cladding functions as the light guiding portion of the waveguide in the coupling region, and the surrounding low index matrix material functions as the cladding. Power then transfers between the adjacent fiber claddings in the coupling region. Reference herein to a fiber propagation constant therefore means $\beta_{CR}$. The propagation constant of a fiber can be permanently modified by changing the core refractive index or diameter or by changing the cladding refractive index or diameter.

Figure 4:
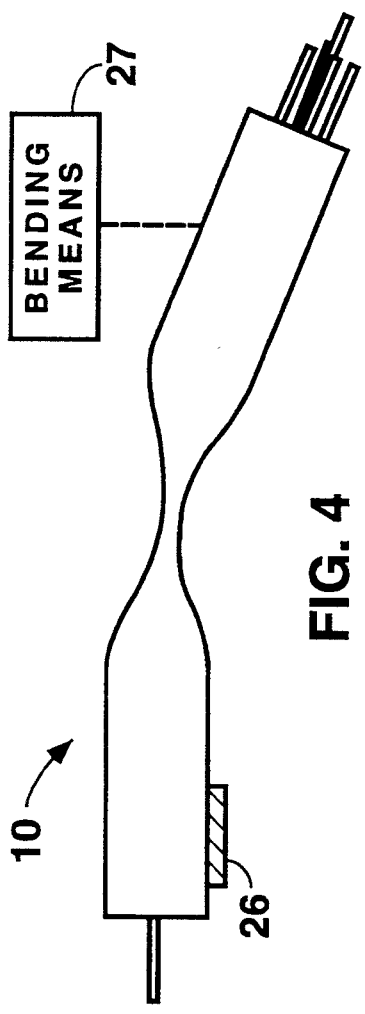
FIG. 4 illustrates a mode of operation of a 1×N switch.
Figure 6:
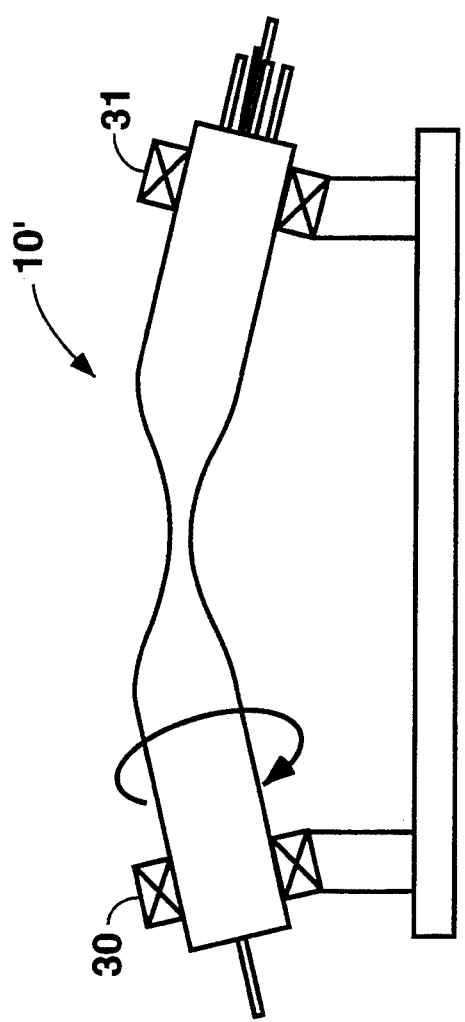
FIG. 6 illustrates the rotation of a bent 1×N coupler.

As shown in FIGS. 1 and 4, switch 10 can be fixed at one end by means 26, the other end of the coupler being bent in any direction about the coupler longitudinal axis by means 27. Referring to FIG. 2, the bending means must be able to bend the coupler in either direction in planes 22 and 24 if the switch is to be able to couple power from fiber 12 to any one of the four output fibers. For certain types of switches, the coupling means should be able to bend the coupler in any intermediate plane that passes through the longitudinal axis such as plane 23. Electromagnetic, piezoelectric, bimetallic and other types of devices can provide the small, controlled movement that is required for bending the switch. Typically, a movement of approximately 1 mm is needed to create large coupling changes in these couplers. The rotary action of the switch disclosed in U.S. Pat. No. 5,146,519 is also well suited for bending coupler 10 in any plane passing through its longitudinal axis. Such a switching mechanism is illustrated in FIG. 6, wherein coupler 10' is bent, and its ends are mounted in bearings 30 and 31. The plane of the bend can be changed from plane 22 to plane 24, for example, by rotating the bent coupler.

Figure 7:
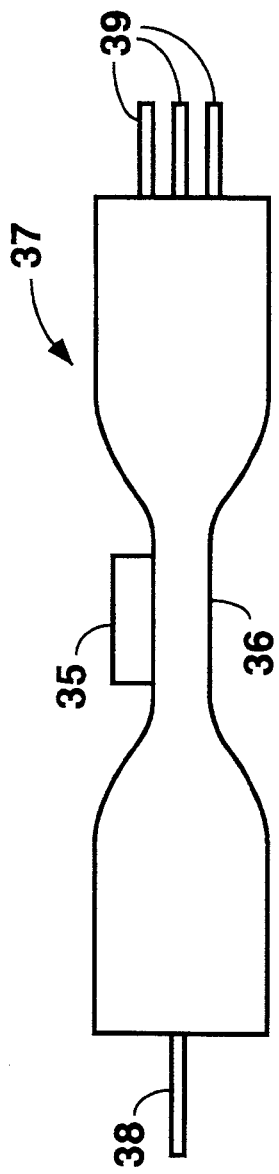
FIG. 7 shows a switch having a thermo-optic device for changing optical fiber propagation constants.

An optical effect such as a stress-optic, electro-optic, thermo-optic or like effect could also be employed for changing the values of $\beta_{CR}$ for each of the fibers and thus initiating switching. Referring to FIG. 7, for example, a heater 35 can be affixed to the coupling region 36 of coupler 37. The refractive index change that is induced in the coupling region can change the propagation constants of the fibers, and thereby initiate switching between input fiber 38 and output fibers 39.

Figure 5:
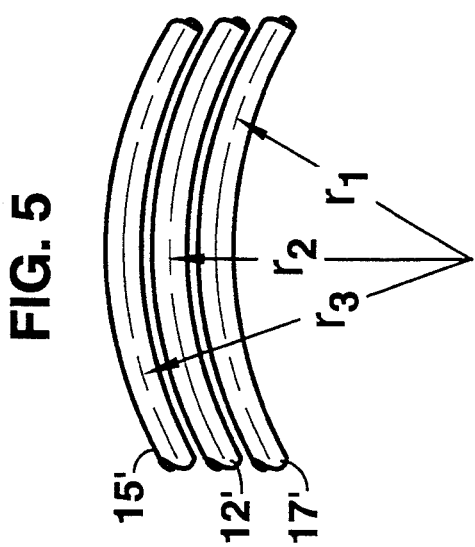
FIG. 5 is a schematic illustration of the effect of bending a 1×N coupler in the coupling region.

In one embodiment the propagation constants of fibers 14'-17' (in the tapered region) are equal to each other but are different from that of fiber 12'. In the straight state shown in FIG. 1, only a minimal amount of power propagating in fiber 12' couples to output fibers, depending on cross-talk requirements. Perhaps 1% of the power might couple in the unbent state. Essentially all (perhaps 99%) of the input power continues to propagate in the output portion of fiber 12'. The switch can be bent so that the axes of some of the fibers 14'-17' that are located in the coupling region lie on circles that are concentric with fiber 12', i.e., within the bend plane. This changes the propagation constants of the fibers that lie in the plane of the bend. The bend plane is that plane that contains the bent central fiber axis, i.e., a bend in plane 24 causes the propagation constants of fibers 15' and 17' to change with respect to that of fiber 12', while the propagation constants of fibers 14' and 16' (those out of the bend plane) remain unchanged with respect to that of fiber 12'. With a bend in plane 24 as shown in FIG. 2, for example, the mismatch of propagation constants of fibers 12' and 17' can be eliminated, thus enabling light to be coupled between fibers 12' and 17', for example. FIG. 5 illustrates the radii of fibers 12', 15' and 17' in the coupling region of such a bent coupler.

Assuming that the propagation constants of fibers 14'-17' are greater than that of fiber 12', the illustrated bend causes the propagation constant of fiber 17' to decrease with respect to that of fiber 12' and the propagation constant of fiber 15' to increase with respect to that of fiber 12'. It leaves the propagation constants of fibers 14 and 16 unchanged relative to that of fiber 12. This will cause fiber 12' to couple to fiber 17'. A bend in the opposite direction in plane 24 modifies the propagation constants of fibers 15' and 17' such that coupling occurs between fibers 12' and 15'. Similarly, a bend in plane 22 that shortens fiber 14' or fiber 16' will yield coupling to that fiber. If the coupler bends in plane 23, light propagating in fiber 12' can couple to both fibers 15' and 16', for example. The ratio of the light coupled to fibers 15' and 16' can be varied by bending the coupler in an axial plane other than plane 23. For example, bending in a plane intermediate planes 23 and 24 can cause more light to couple to fiber 15'. Thus, light propagating in fiber 12' can be coupled to only one of the fibers 14'–17' or to more than one of those fibers in various ratios by bending the coupler in the appropriate axial plane and direction.

If the propagation constants of fibers 14'–17' in the coupling region were less than that of fiber 12', light would couple from fiber 12' to fiber 15' when the coupler is bent as shown in FIG. 5.

This mode of operation, in which essentially all of the power remains in the input fiber in the unbent state, is limited to those couplers having no more than four output fibers around the input fiber in the sense that performance is seriously degraded if more than four fibers are used. There would be coupling to more than one fiber in the bent state if more than 4 output fibers were employed, unless the output fibers had different propagation constants or spacings, whereby they would need different bends for coupling to occur.

In the above-described embodiment, the input fiber extends through the switch and becomes one of the output fibers. However, coating material could be stripped from an end of central fiber 12', and it could be inserted into the overclad tube so that its coated portion extends from only that end of switch 10 that is opposite the end from which fibers 14'–17' extend. In this 1×4 embodiment, only fibers 14'–17' would be output fibers.

Another embodiment concerns an N-around-1 coupler (8-around-1 is specifically considered here in FIG. 8) where the normal mode of operation (the unbent state) is as a passive 1×N splitter in which the light input to the central fiber is equally split among the N outputs. For a description of a splitter that is designed to be an optimal 1×N passive splitter in its straight state, see U.S. patent application Ser. No. 913,390 "Achromatic Overclad Fiber Optic Coupler" filed Jul. 15, 1992 (Weidman - 6). Such a coupler can be bent and rotated such that a single output can be addressed from upstream test equipment. This type of switch is useful in any fiber optic system where there is the need for testing, not only in the case of a failure downstream from the splitter, but also for periodic maintenance and upgrade testing.

In the specific case of a 1×8 splitter, the coupler is designed to function optimally in the straight position, i.e. one-eighth of the power output is coupled to each of the 8 ring fibers (zero excess loss being assumed). By applying the above-described model to this type of coupler, it has been found that by bending such a coupler so that $\delta\beta_{bend} = 12.5\ C_{12}$, and rotating the coupler to an optimum angle, the power in a particular output can be increased to 25% of the input power, while the power to all of the other outputs can be reduced to less than 2% of the input power. FIG. 9 shows the output power in two optically adjacent channels (e.g. fibers 51 and 55) as a function of bend angle. The curves representing power coupled to fibers 52 through 54 and 56 through 59 would be similar to the curve for fiber 51, except for the angle of maximum coupled power. Note the presence of angles at which each of the fibers 51 and 52 is given 25% coupled power while the other has very small coupled power. At peak transmission for one fiber, the most power that is coupled to any other fiber is approximately 11 dB down. If this is not adequate, the ratio between power coupled to the designated fiber and power coupled to adjacent fibers can be increased either by bending the coupler more or by designing the coupler in its straight state to be slightly non-optimum. While increased bending would seem to be the preferred solution, there is a maximum allowable bend which a coupler can undergo before there is danger of breakage. If this bend is not sufficient, it is possible to re-design the coupler in the straight state, as described below, although at the cost of increased loss in its passive (straight) state.

Specifically, if the coupling length z is chosen to be 29% longer than needed for optimum (100%) coupling, a straight-state insertion loss penalty of 1.0 dB will result in an increase in the insertion loss of the "off" state fibers to 30 dB, a 13 dB increase over the previously discussed coupler. Insertion loss IL between input fiber i and output fiber j is defined as $$IL = -10 \log_{10}\left(\frac{\text{power at output } j}{\text{power at input } i}\right) \quad (8)$$

FIG. 10 shows that by bending such a coupler to the same bend as the previous example, and rotating the coupler to an optimum angle, the power in output fiber A, for example, can be increased to about 39% of the input power, while the power to other outputs can be reduced to less than 0.1% of the input power.

The above description is limited to N-around-1 devices; however, more than one input fiber could be centrally disposed in the device. However, such N-around-M devices are not specifically discussed since analysis of such devices is more complicated and performance is degraded in comparison to N-around-1 devices.

Whereas the above-described devices pertain to couplers in which similar output fibers are equally spaced about the input fiber, switches within the scope of the invention may have output fibers that are not equally spaced but that are symmetrical with respect to the input fiber. In the embodiment of FIG. 11, four output fibers 61 are symmetrically arranged about input fiber 60. This spacing could be achieved by using two pure silica dummy fibers 62 to space output fibers 61. Fibers 61 are symmetrically arranged since each of them sees the same environment.

Switches within the scope of the invention may also have output fibers that are dissimilar and/or that are non-symmetrically disposed with respect to the input fiber.

For example, fibers 14, 15, 16 and 17 of FIG. 1 could have different propagation constants, whereby a different bend would be required to switch an input signal of a specific wavelength to each output fiber. Alternatively, a different wavelength could be coupled to each output fiber by subjecting the output fibers to a given bend angle.

As illustrated by the embodiment of FIG. 12, coupling between the input fiber and the output fibers is affected by the distance between those fibers. Output fibers 64 and 65 are located immediately adjacent input fiber 63 in the coupling region. Fibers 66 and 67 are surrounded by sleeves 68 and 69, respectively, whereby they are spaced from input fiber 63. If the coupler is bent a given angle in a first plane, fibers 64 and 65 will undergo a given propagation constant change. By bending the coupler the same angle but in a plane orthogonal to the first plane, fibers 66 and 67 will undergo a propagation constant change that is different from the given propagation constant change.

FIG. 13 shows a 1×2 fiber arrangement in which output fibers 72 are equally spaced about input fiber 71. In the 1×2 fiber arrangement of FIG. 14, output fibers 75 are symmetrically arranged with respect to input fiber 74.

In the embodiment of FIG. 15, output fibers 80, 81, 82 and 83 are non-symmetrically disposed around input fiber 79. An input signal could be switched from input fiber 79 to one of the output fibers.

Whereas the invention has been particularly described in conjunction with overclad devices, fused biconic tapered coupler devices are also contemplated. Such a device can be made by assembling the desired array of fibers. For example, a 1×6 or 1×7 switch could be formed by assembling six optical fibers around one fiber of similar diameter. The central fiber extends from both ends of a 1×7 device, whereas it extends from only one end of a 1×6 device. The central region of the fibers is heated and the fibers are pulled to form a coupling region where the tapered waists of the stretched fibers are joined. The resultant coupler is then provided with means for bending one end thereof with respect to the other end in different directions as described above.

We claim:

1. A fiber optic device comprising
   a coupler having at least a first optical fiber and a plurality of optical fibers, portions of said plurality of fibers being situated adjacent a portion of said first fiber in a narrowed region where said fibers are elongated and said plurality of fibers are optically coupled with said first optical fiber, and
   means for changing the propagation constant of each of said plurality of fibers with respect to the propagation constant of said first fiber to vary the amount of light coupled from said first fiber to any of said plurality of fibers.

2. A fiber optic switch in accordance with claim 1 wherein said means for changing the propagation constant of one or more of said plurality of fibers comprises means for bending said coupler at said narrowed region.

3. A fiber optic switch in accordance with claim 2 wherein said means for bending is capable of bending said coupler in a first direction to maximize coupling to one of said plurality of fibers and of bending said coupler in a second direction to maximize coupling to another of said plurality of fibers.

4. A fiber optic switch in accordance with claim 2 wherein said means for bending is capable of bending said coupler in a direction that induces simultaneous coupling to more than one of said plurality of fibers.

5. A fiber optic switch in accordance with claim 2 wherein said means for bending comprises means for bending said coupler and means for rotating said coupler in the bent state.

6. A fiber optic switch in accordance with claim 1 wherein the coupling characteristics of said coupler are such that there is substantially no coupling from said first fiber to said plurality of fibers when said coupler is in the unbent state.

7. A fiber optic switch in accordance with claim 6 wherein said plurality of fibers comprises no more than four fibers.

8. A fiber optic switch in accordance with claim 1 wherein the coupling characteristics of said coupler are such that substantially all of the light propagating in said first fiber couples to said plurality of fibers when said coupler is in the unbent state.

9. A fiber optic switch in accordance with claim 8 wherein said plurality of fibers comprises more than four fibers.

10. A fiber optic switch in accordance with claim 1 wherein the coupling characteristics of said coupler are such that most of the power from said first fiber couples to said plurality of fibers when said coupler is in the unbent state.

11. A fiber optic switch in accordance with claim 10 wherein said plurality of fibers comprises more than four fibers.

12. A fiber optic switch in accordance with claim 1 wherein said plurality of fibers are symmetrically disposed with respect to said first fiber in said narrowed region.

13. A fiber optic switch in accordance with claim 1 wherein said plurality of fibers are equally spaced said first fiber in said narrowed region.

14. A fiber optic switch in accordance with claim 1 wherein said plurality of fibers are non-symmetrically disposed with respect to said first fiber in said narrowed region.

15. A fiber optic switch in accordance with claim 1 wherein each of said plurality of fibers contacts said first fiber in said narrowed region.

16. A fiber optic switch in accordance with claim 1 wherein some of said plurality of fibers are spaced from said first fiber in said narrowed region.

17. A fiber optic switch in accordance with claim 1 wherein the propagation constants said plurality of fibers in said narrowed region are equal.

18. A fiber optic switch in accordance with claim 1 wherein the propagation constants said plurality of fibers in said narrowed region are not equal.

19. A fiber optic switch in accordance with claim 1 wherein said first fiber and said plurality of fibers include a glass core surrounded by cladding glass, the lowest refractive index of any of the fiber claddings being $n_2$, at least those portions of said first fiber and said plurality of fibers that are located in said narrowed region being embedded in matrix glass having a refractive index lower than $n_2$.

20. A fiber device comprising
   a coupler having at least a first optical fiber and a plurality of optical fibers, portions of said plurality of fibers being situated adjacent a portion of said first fiber in a narrowed region where the mode field of said first fiber overlaps the mode fields of said plurality of fibers, and
   means for bending said coupler at said narrowed region to couple an optical signal from said first fiber to any one of said plurality of fibers at a given insertion loss, the insertion loss between said first fiber and the remaining of said plurality of fibers being at least 10 dB greater than said given insertion loss.

* * * * *